US007114120B2

(12) United States Patent
Okita (10) Patent No.: US 7,114,120 B2
(45) Date of Patent: Sep. 26, 2006

(54) DATA PROCESSING APPARATUS AND DATA PROCESSING METHOD

(75) Inventor: Ryoji Okita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 10/306,846

(22) Filed: Nov. 25, 2002

(65) Prior Publication Data

US 2004/0025101 A1    Feb. 5, 2004

Related U.S. Application Data

(63) Continuation of application No. PCT/JP02/07754, filed on Jul. 30, 2002.

(51) Int. Cl.
*H03M 13/00* (2006.01)

(52) U.S. Cl. ...................... 714/774; 714/704

(58) Field of Classification Search ............... 714/756, 714/751, 755, 764, 758, 748, 769, 752, 776, 714/708, 774, 704; 386/81; 370/475; 709/250
See application file for complete search history.

(56) References Cited

U.S. PATENT DOCUMENTS

| | | | | |
|---|---|---|---|---|
| 3,800,281 | A * | 3/1974 | Devore et al. ............... | 714/755 |
| 3,956,589 | A * | 5/1976 | Weathers et al. ........... | 370/296 |
| 4,145,683 | A * | 3/1979 | Brookhart ................... | 714/758 |
| 4,149,142 | A * | 4/1979 | Kageyama et al. ......... | 714/748 |
| 4,205,324 | A * | 5/1980 | Patel ........................... | 714/804 |
| 4,254,500 | A * | 3/1981 | Brookhart ................... | 386/87 |
| 4,292,684 | A * | 9/1981 | Kelly et al. ................. | 714/764 |
| 4,441,184 | A * | 4/1984 | Sonoda et al. ............... | 714/755 |
| 4,677,647 | A * | 6/1987 | Aoyagi ....................... | 375/344 |
| 5,170,413 | A * | 12/1992 | Hess et al. ................... | 375/260 |
| 5,361,266 | A * | 11/1994 | Kodama et al. ............. | 714/758 |
| 5,579,341 | A * | 11/1996 | Smith et al. ................. | 375/267 |
| 5,835,499 | A * | 11/1998 | Kimura et al. .............. | 714/703 |
| 5,844,918 | A * | 12/1998 | Kato .......................... | 714/751 |
| 5,875,202 | A * | 2/1999 | Venters et al. .............. | 714/807 |
| 5,991,627 | A * | 11/1999 | Honkasalo et al. ......... | 455/437 |
| 6,092,231 | A * | 7/2000 | Sze ............................ | 714/758 |
| 6,243,568 | B1 * | 6/2001 | Detlef et al. ............. | 455/226.4 |
| 6,279,139 | B1 | 8/2001 | Miyasita | |
| 6,421,805 | B1 * | 7/2002 | McAuliffe ................... | 714/756 |

FOREIGN PATENT DOCUMENTS

| | | |
|---|---|---|
| JP | 57-107646 | 7/1982 |
| JP | 4-268851 | 9/1992 |
| JP | 11-327939 | 11/1999 |
| JP | 2000-068986 | 3/2000 |
| JP | 2001-251244 | 9/2001 |

* cited by examiner

*Primary Examiner*—Albert Decady
*Assistant Examiner*—Mujtaba K. Chaudry
(74) *Attorney, Agent, or Firm*—Katten Muchin Rosenman LLP (57) ABSTRACT

A data processing apparatus includes a decision section that determines a predetermined plurality of channels of original data and a predetermined channel of correction data based on data of received signals; an exclusive OR circuit that calculates an exclusive OR upon the channels of the decided data; a signal quality decision section that detects signal quality of received data on each channel; and a correction section that replaces a channel of data whose channel has a worst detection result as detected by the signal quality detection section with the result of the exclusive OR calculation when the result of the calculation is other than "0". The signal quality detection section calculates a mean signal quality and an instantaneous signal quality that are used by the correction section to determine the worst channel.

11 Claims, 8 Drawing Sheets

DATA PROCESSING APPARATUS AND DATA PROCESSING METHOD

This is a request for filing a continuation application under 37 CFR 1.53(b) of pending prior international application No. PCT JP02/07754, filed on Jul. 30, 2002 entitled DATA PROCESSING APPARATUS AND DATA PROCESSING METHOD, which designated the United States.

TECHNICAL FIELD

The present invention relates to a data processing apparatus and a data processing method. Specifically, the present invention relates to a data processing apparatus that has a data error correction function to correct data errors that occur while data in a plurality of channels go through a predetermined medium and also relates to a method therefor.

BACKGROUND ART

In the field of data processing, and particularly in the field of data processing such as transmission, recording or reading out of predetermined data by way of predetermined media, there are processes wherein the data are first converted into a predetermined type of data format suitable for the medium to be used. The converted data are then input into and output from the medium, and thereafter, reconstituted into the original data. Such data processing occurs, for example in: power-line carrier communication of a variety of information including voice, image, etc.; communication using telephone lines as its medium; data transmission employing ADSL technology or other XDSL technologies using metallic wires as its medium; data transmission by way of wireless communication in the 2.4 GHz frequency band employing Bluetooth or wireless LAN; data transmission by way of coaxial cables for a CATV service employing CATV technology; employment of HomePNA (Home Phoneline Networking Alliances) using telephone wires present within each home; technologies using optical fiber as their medium; and wireless communication technologies in 800 MHz or 1.9 GHz frequency band when using cell phones or PHS phones, respectively. In the data recording and readout field, technologies to utilize magnetic disks or optical disks, etc., are included. Also, technologies that convert predetermined digital data into bar codes, print the bar codes and read them by using lasers or CCDs so as to reconstitute them into the original data, are included, as well as other equivalent technologies, in the applicable scope of the present invention.

In these data processing technologies, an apparatus that performs the steps of first converting or modulating predetermined data into a predetermined data format suitable for the medium to be used, then outputting the data from the medium and reconstituting to obtain the original data can be considered as a "modem" in the broad sense of the term. In the following examples, for explanatory convenience, descriptions are made in connection with a modem for power-line carrier communication, however, the applicable scope of the present invention is not limited to power-line carrier communication modems. In fact, the present invention is applicable to a variety of fields as stated above.

Figure 1:
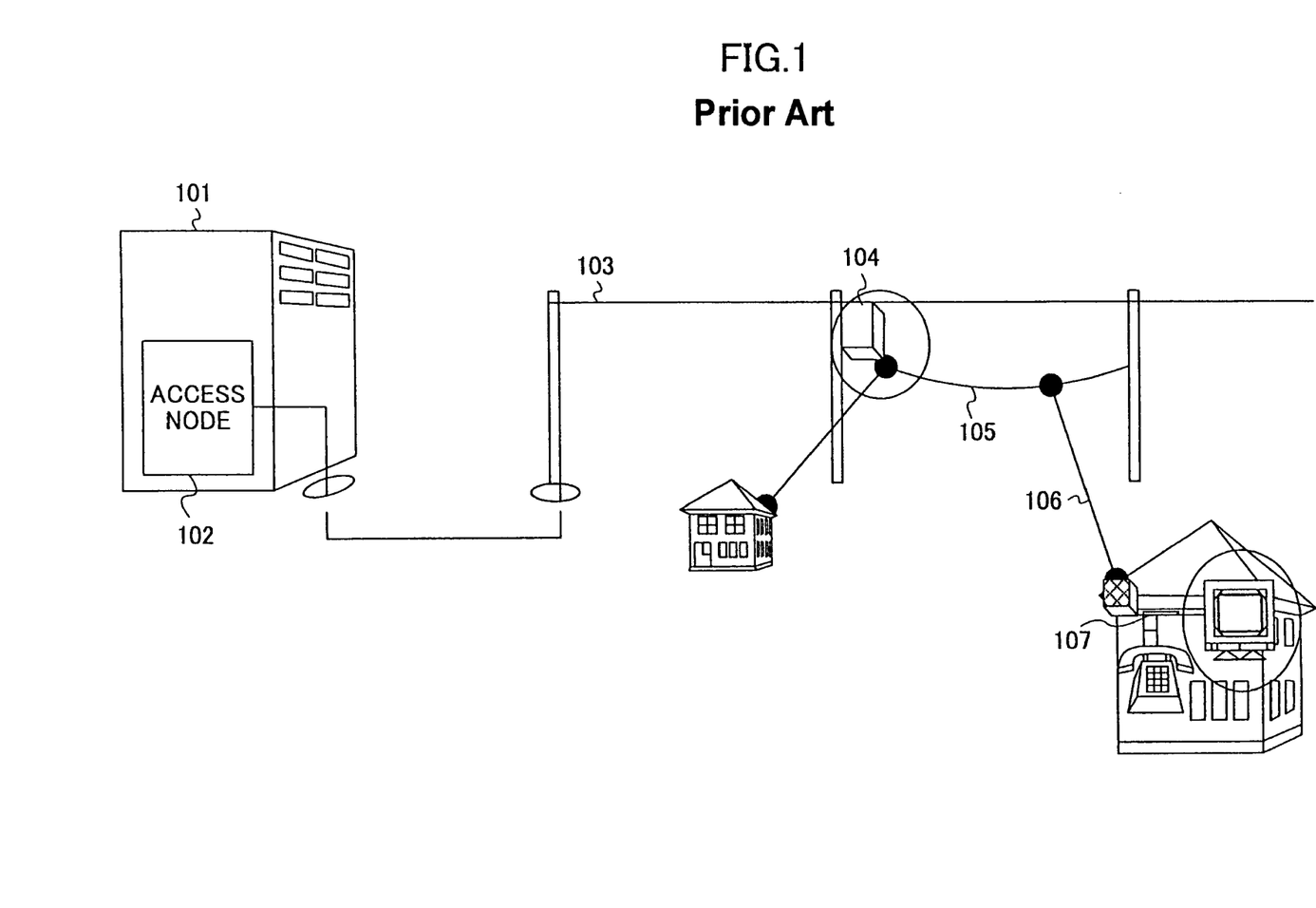
FIG. 1 is an illustration for use to show a rough outline, of a power-line carrier communication system, to which the present invention is applicable.

FIG. 1 shows such a power-line carrier communication system. In the drawing, a distribution substation is indicated by a reference numeral 101, as well as an access node 102, a high-voltage distribution line 103, a pole transformer 104, a low-voltage distribution line 105, a drop wire 106 and interior electric wiring 107.

In this system, high-voltage AC power (for example, 66 kilo VAC) is supplied from the distribution substation 101, by way of the high-voltage distribution line 103, to each pole transformer 104. Then it is stepped down, by means of the pole transformer 104, to obtain electric power of 100 volts or 200 volts that is suitable to be supplied to a consumer's house, such as each home, etc. Then the stepped-down power is supplied, by way of the low-voltage distribution line 105 and the drop wire 106, to the indoor electric wiring 107 of the consumer's house. Thus, various electric equipment connected to the indoor wiring 107 or various electric appliances of which power cords are plugged into convenience outlets can be powered and operated.

Additionally, the access node 102 located at the distribution substation 101 and a modem (not shown in this figure) located at the pole transformer 104 are connected to each other, with a fiber-optic transmission line (not shown in this figure). The fiber-optic transmission line is generally set along the route of the high-voltage distribution line 103. In the modem located at the pole transformer 104, bidirectional signal conversions of optical signals to electric signals and vice versa are carried out. The low-voltage distribution line 105, the drop wire 106 and the indoor wiring 107 are utilized as wire-link data transmission lines. Consequently, just a connection of a terminal unit to the wall socket connected to the indoor wiring 107 can configure a power-line carrier communication system, i.e., the system portion so-called "the last one mile" that can perform data transmission between the access node 102 and the terminal unit.

In such a power-line carrier communication system, the low-voltage distribution line 105, as seen from the modem located at the pole transformer 104, constitutes inductive impedance. In contrast, the drop wire 106 and the indoor wiring 107 constitute capacitive impedance. Further, each unit of the various electric equipment connected to the indoor wiring 107 generally has a structure connecting a capacitor for cutting off noise. Therefore, impedance of the low-voltage distribution line side seen from the modem located at the pole transformer 104 has relatively high inductance and capacitance.

As a result, the low-voltage distribution line (105) side, as seen from the modem located at the pole transformer 104, can be regarded as a low-pass filter, which means that the receive signals coming into another modem connected to the indoor wiring 107 have already been subjected to a substantial attenuation with respect to the high-frequency-range component thereof. Therefore, there is a possibility that the broadband component of the receive signals is submerged in the noise. The low-frequency-range component of the receive signals is not attenuated in such a degree as the high-frequency-range component is, but is quite vulnerable to random noise resulting from various electric equipment, such as an inverter circuit, a switching power supply, etc.

DISCLOSURE OF THE INVENTION

Keeping in mind the above situation, it is a general object of the present invention to provide, in a modem as the above "modem" in the broad sense of the term, a data processing apparatus and a data processing method, each being capable of effectively making correction against data errors, such data errors occurring while the data go through a predetermined medium.

In order to attain the above, there is provided according to the present invention a structure, comprising:

decision means for deciding a predetermined plurality of channels of original data and a predetermined channel of correction data based on signals obtained by a step of transmitting signals (that represent a plurality of channels of data whose channels include said predetermined correction channel, said predetermined correction channel containing results of a predetermined operation performed with respect to said predetermined plurality of channels of data) through predetermined media;

operation means for performing operations on decided data from said predetermined plurality of channels and decided data from said predetermined correction channel, both such data obtained from said deciding by the decision means;

signal quality detection means for detecting signal quality of each channel with regard to said signals that said data decisions by said decision means are based on; and correction means for replacing a decided worst channel of data (having worst detection result according to said signal quality detection means) by values estimated from decided channels of data other than said worst channel of data when the result of said operation means is different from a predetermined value, wherein said signal quality detection means calculates mean signal quality and instantaneous signal quality, and said correction means references said mean signal quality and said instantaneous signal quality so as to determine said worst channel that is presenting worst signal quality.

As a result, there can be provided a data processing method or system that is capable of effective data error correction against those data errors caused by noise in a situation when the medium is considerably affected by instantaneous noise in addition to constant noise.

BEST MODE FOR CARRYING OUT THE INVENTION

The embodiment of the present invention is described in detail below, with reference to the drawings.

Figure 2:
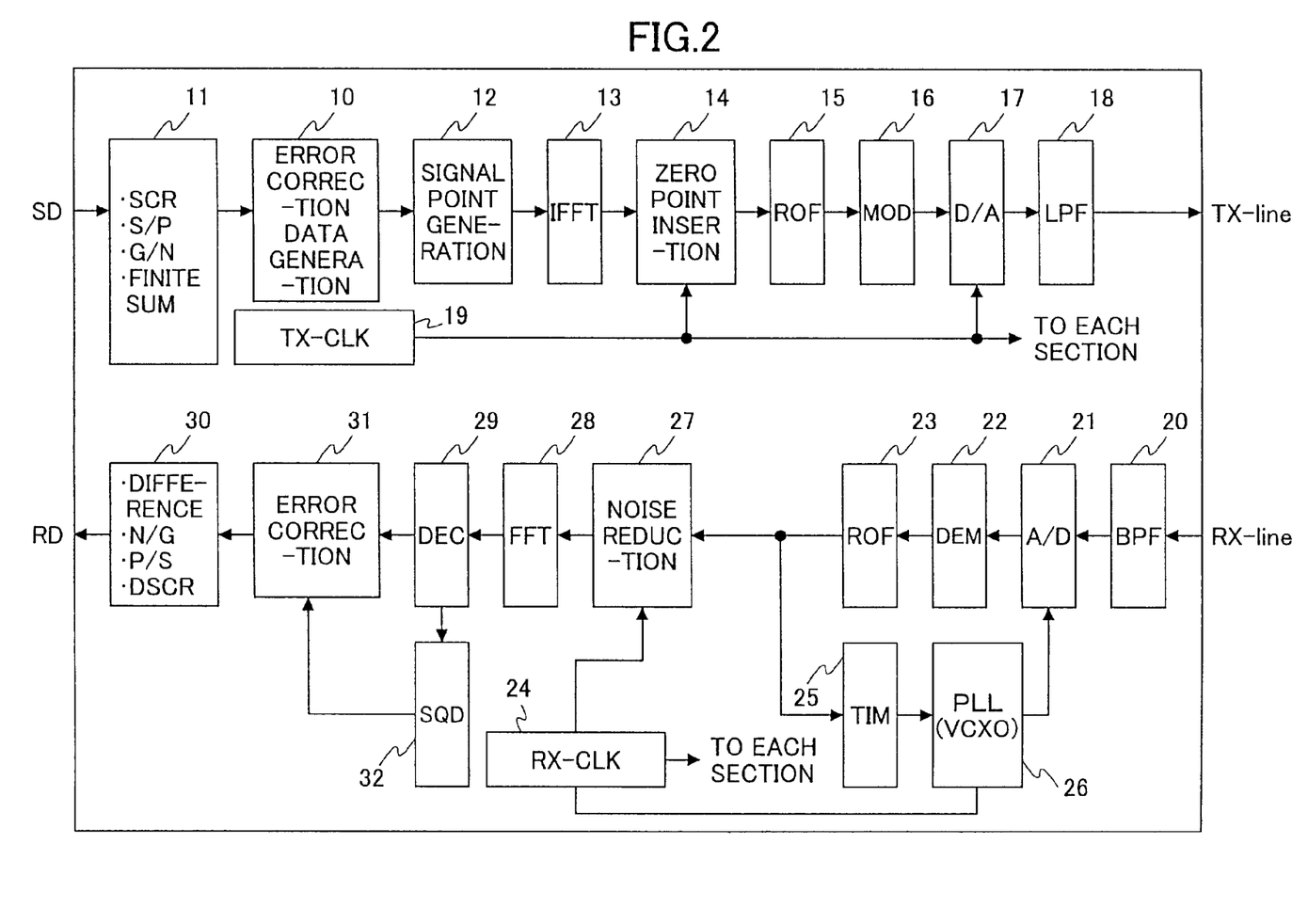
FIG. 2 is a block diagram to show a rough outline of a data transmission apparatus according to one embodiment of the present invention, which can be used in the power-line carrier communication system of FIG. 1.

FIG. 2 is a block diagram to illustrate a configuration of a modem as a data processing apparatus according to one embodiment of the present invention. This modem can be used as the modem that is connected to the indoor wiring in the power-line carrier communication system and sends and receives data, as described above in reference to FIG. 1. In FIG. 2, a code conversion section 11 has functions such as SCR (scrambler), S/P (serial/parallel conversion), G/N (gray code/natural code conversion), finite sum operation, etc. Further, the modem includes an error data correction data generation section 10 and a signal point generation section 12. Still further, the modem includes an IFFT (inverse fast Fourier transform) section 13 having a GT (guard time) adding function, a zero-point insertion section 14, a roll off filter 15, a modulation section 16, a digital-analog converter 17, a low-pass filter 18 and a transmit clock generation section 19. In the figure, "TX-line" denotes a transmit line and "RX-line" denotes a receive line, respectively.

In addition, the modem includes a band-pass filter 20, an analog-digital converter 21, a demodulation section 22, a roll off filter 23, a receive clock distribution section 24, a timing-sampling section 25, a PLL (phase-locked loop) circuit 26 including a VCXO (voltage-controlled crystal oscillator), a noise reduction section 27, a FFT section 28 having a GT (guard time) removal function, a signal decision section 29 and a code conversion section 30. The code conversion section has functions such as finite difference operation, N/G (natural code/gray code) conversion, P/S (parallel/serial) conversion, DSCR (descrambler), etc. In the figure, "SD" denotes a send signal and "RD" denotes a receive signal.

In the modem, clock signals generated by the transmit clock generation section 19 are supplied to various sections, for example, to the zero point insertion section 14, where clock signals are provided as timing signals for inserting zero point. At the code conversion section 11, the send signals SD go though processes such as a scrambling process, a parallel conversion process in accordance with the number of carriers, a conversion process from gray code to natural code, a finite sum operation process that allows a receiving side to perform a finite difference operation, etc. After that, the send signal SD is sent to the signal point generation section 12 via the error correction data generation section 10. At the signal point generation section 12, signal points in accordance with Nyquist interval are generated from receive signals. Adding of Guard Time GT and inverse FFT process are performed by the inverse FFT section 13. Then, at the zero point insertion section 14, a zero point that shows level 0 is inserted in accordance with the aforementioned timing signals for insertion of zero point. Waveform shaping is performed by the roll off filter 15. At the modulation section 16, a predetermined digital modulation is performed. At the digital-analog converter 17, conversion into analog signals is performed. The signals are then processed by the low-pass filter 18 so as to obtain signals, for example, from 10 to 450 kHz transmission band. After that the obtained signals are sent into the transmit line (TX-line). By the way, in this case, the modem is connected to the transmit line (TX-line) and the receive line (RX-line) by way of indoor wiring, a coupling filter, etc.

Clock signals based on the clock signals from the phase-locked loop circuit 26 are distributed to various sections by the receive clock distribution section 24. Signals received by way of the receive line (RX-line) are then processed by the band-pass filter 20 so as to obtain signals in, for example, from 10 kHz to 450 kHz band. After that the obtained signals are converted into digital signals by the analog-digital converter 21, then are demodulated by the demodulation section 22 and then undergo a waveform shaping process provided by the roll off filter 23. At the noise reduction section 27, levels of noise superposed at the zero point position are obtained based upon the clock signals from the receive clock distribution section 24, and noise levels at the signal points are obtained by an interpolation process so as to remove the noise superposed at the signal points. Then, removal of the guard time (GT) and a process of conversion into the frequency domain are performed by the FFT 23. Then, signal decision is made by the signal point decision section 29. At the code conversion section 30, processes such as parallel-serial conversion, descrambling, finite difference operation, and conversion from natural code to gray code, etc., are performed so as to obtain the receive signal RD.

By the way, the contents of the above mentioned data processing are basically similar to those disclosed in conjunction with the data transmission apparatus as or systems proposed in some of the same applicant's patent applications in Japan, i.e., Japanese Patent Application No. 2001-186274 (filed Jun. 20, 2001) and No. 2002-023325 (filed Jan. 31, 2002), etc., and further detailed descriptions of such basic contents are hereby omitted.

Since there is the zero point insertion effected by the zero point insertion section 14 as stated above, the noise superposed at the zero point position can be sampled, and based on the sampled zero point superposed noise, the signal point superposed noise is cancelled out. Such a compensation approach can be employed so that adverse effects of the noise are reduced in order to achieve a high speed transmission. In general, however, the noise distribution tends to be in a scattered manner, at relatively high levels, and over a plurality of bands. Not only that, in many cases, the noise levels and bands are time varying. Thus, there still is a possibility that the removal of noise components are not reliably achieved. Also, when a multilevel modulation is employed, it is foreseen that the modulation signal points of the receive signals fluctuate largely due to effects of noise, thereby causing data decision errors.

According to the embodiment of the present invention, error corrections are effectively carried out by utilizing at least one error-correction channel when data are transmitted at high speed by conversion into a plurality of channels. Incidentally, proposals having similar contents are made in a same applicant's patent application, i.e., Japanese Patent Application No. 2001-329481 (filed Oct. 26, 2001). Nonetheless, the present invention is to propose a configuration that is capable of being more effective in removing the adverse effects of noise.

More specifically, according to the embodiment of the present invention, error correction is enforced by features of an error correction section 31 and a signal quality detection section 32 that will be described later, in addition to the above stated functions. Further, for instance, the aforementioned error correction data generation section 10 employs one of 21 transmission channels as an error correction channel, and employs results of an exclusive OR operation (XOR operation) or results of a modulo sum upon the remaining 20 channels as send data of the error correction channel. Alternatively, the same results may be further inverted and then such inverted results may be treated as the send data of the error correction channel. The send data are input into the signal point generation section 12, where assignment of multilevel modulation signal points corresponding to the send data are performed.

As for the receive signal RD, decision results and receive signals obtained at the signal decision section 29 are input into the signal quality detection section 32, where signal qualities corresponding to respective channels are calculated. The error correction section 31 conducts an exclusive OR (XOR operation) or a modulo sum operation process on the decision results (obtained by the decision section 29) across the respective channels. The signal quality detection section 32 outputs signal quality values obtained by, for instance, as will be described later, converting error signals that show the differences between the receive signals and the decision results into scalar values, and then calculating differences between a reference value (which is related to the error ratio) and results of integration of the scalar values. Incidentally, there are known such kinds of signal quality value calculation methods, for example, those disclosed in Japanese Examined-Pre-Patent (or Koukoku) Publication No. 58-54686 and Japanese Unexamined (or Koukai) Patent Publication No. 57-107646. However, in these methods, signal qualities are calculated by averaging.

When results of XOR operations (or results of modulo sum operations) on send data of the channels except the error correction channel are employed as send data of the error correction channel at the sending side, and if there is no error, results of XOR operations (or results of modulo sum operations) on the decision result data in the error correction section 31 come to take the value of "0" (zero). Alternatively, when the results of XOR operations (or results of modulo sum operations) are further inverted and then such inverted results are employed as the send data of the error correction channel at the sending side, and if there is no error, results (of XOR operations or results of modulo sum operations on the decided data in the error correction section 31) come to take the value of "1". These values are specific values that can be set beforehand. When there is no error, it is sufficient to just transfer the incoming decided data (as they are, i.e., without change) with respect to the 20 channels into the code conversion section 30.

On the other hand, when the result of exclusive OR operations is not the above predetermined specific value (such as "0", etc.), it is determined that an error has occurred in the data in whichever of the channels, and therefore, error correction is performed by replacing the channel of data having worst quality (most deterioration) detected by the signal quality detection section 32 with a result of exclusive OR operations (or a result of modulo sum operations) on the channels of data except the worst quality channel.

Figure 4:
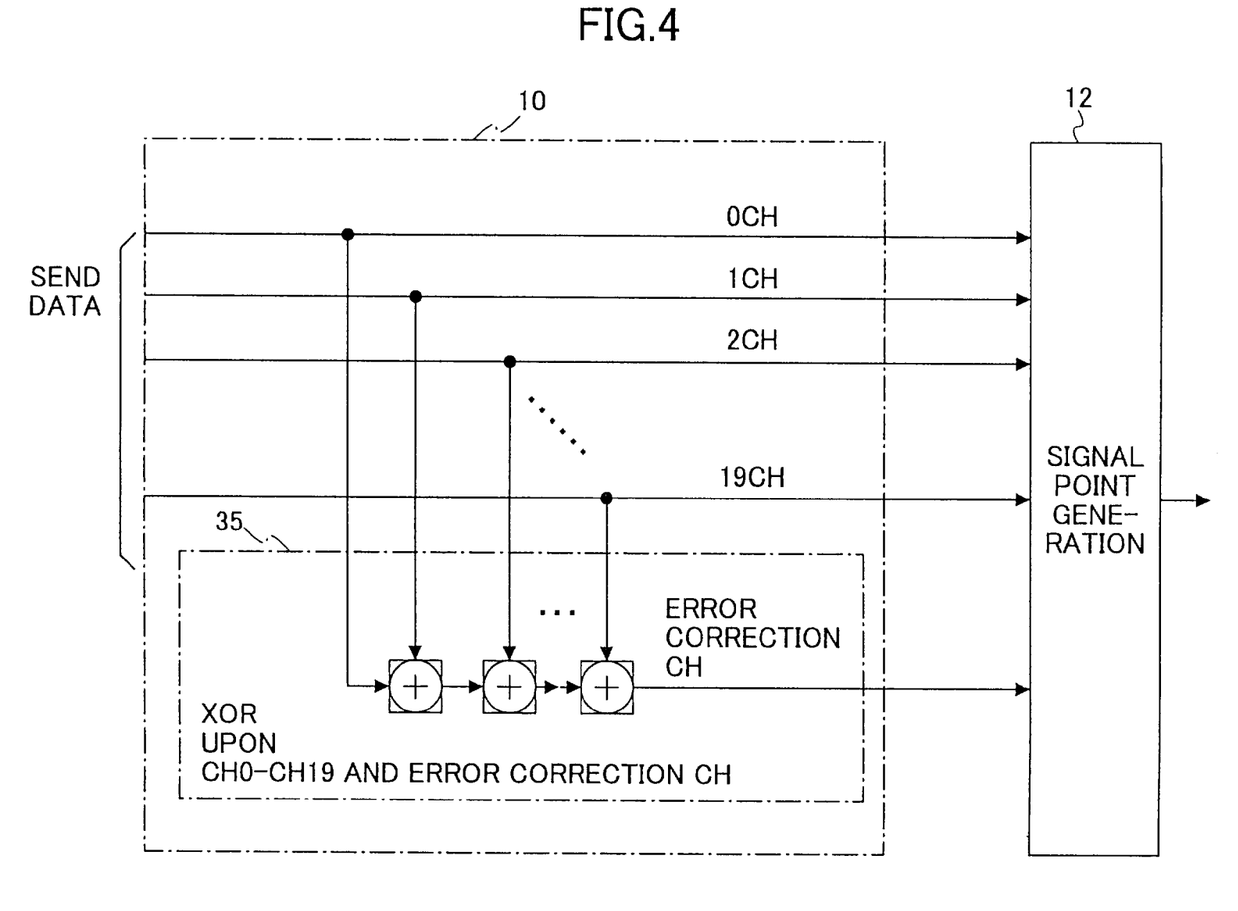
FIG. 4 is a diagram to illustrate the functions of the error correction data generation section shown in FIG. 2.

FIG. 3 is an explanatory diagram of the error correction data generation section 10 shown in FIG. 2. The XOR operation section 35 has a configuration that sequentially obtains XOR operation results on the respective channel data. This XOR section 35 can be a logic gate circuit that performs XOR operations sequentially and in parallel-like manner. Alternatively, it can be a configuration that performs suitable XOR operations with software. Further alternatively, equivalent results can be obtained when the respective channel data are subjected to the modulo sum operation. Therefore, the XOR section 35 in this embodiment may be something that includes a modulo sum operation section.

By means of the XOR section 35, XOR of data on 20 channels of 0CH (i.e., channel "0") through 19CH (i.e., channel 19) are calculated and the result is treated as the send data of the error correction CH (acronyms like "—CH" for "channel—" are hereinafter used where necessary). Thus, at this stage, a result of XOR operations on, the send data of the error correction CH and the send data of the other channels (0CH–19CH) would take the value "0". Incidentally, to briefly illustrate XOR operations, for instance, be it that there are 0CH, 1CH and 2CH, where 0CH and 1CH are for data, and 2CH is for error correction. The XOR logic operation discussed here is an operation of which result takes the value of "1" when two bits' respective values are different logical values, and otherwise (when such values are the same logical value) takes the value of "0". The same thing can be said about the modulo sum operation. Therefore, in the above example, further be it that the data of 0CH is "01" and the data of 1CH is "11", then the XOR result is "10", which is utilized as the data of the error correction CH. Then the XOR result on the three channels in total that includes the error correction CH added to 0CH and 1CH becomes "00", as a result of sequential XOR (or modulus sum) operations upon "01", "11" and "10". Data of the error correction CH and data of channels 0CH–19CH from the XOR section 35 are input into the signal position generation section 12 so as to generate data indicative of modulation signal points, which are input into the inverse FFT section 13 shown in FIG. 2.

Figure 3:
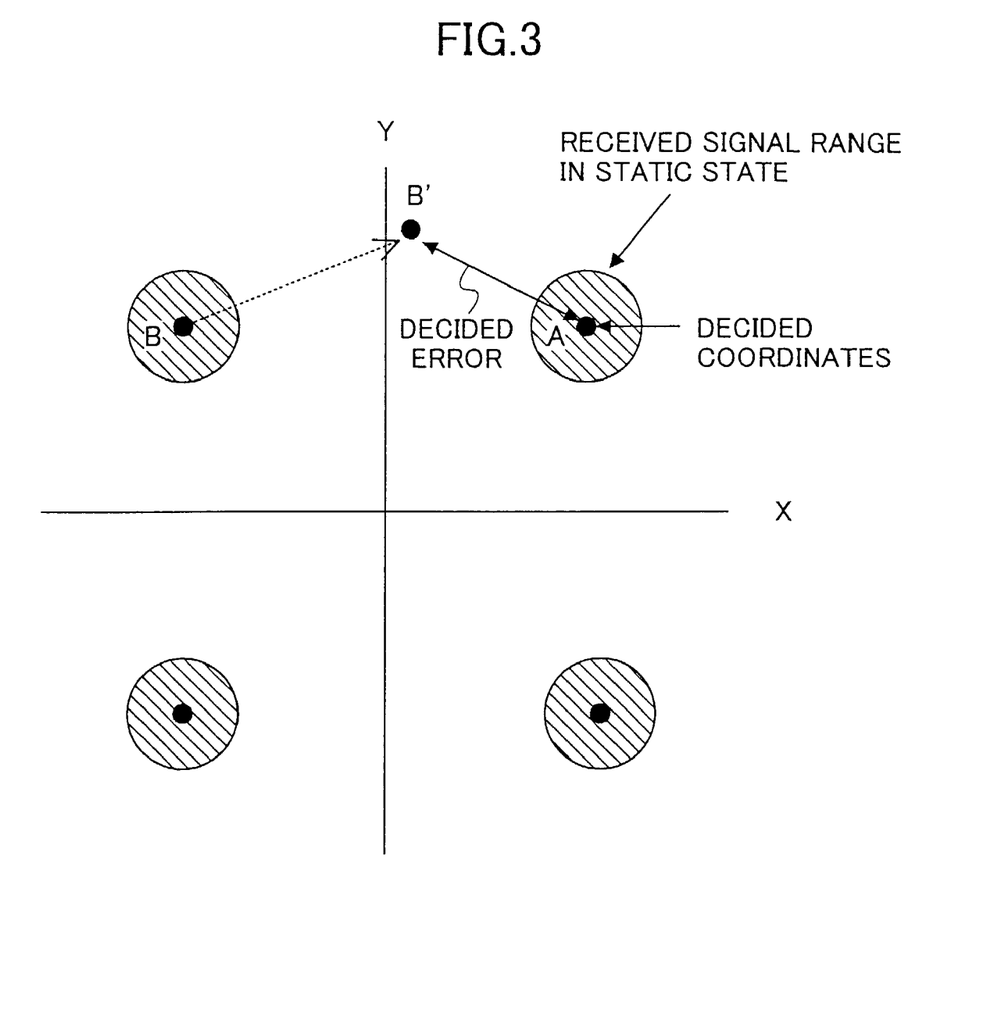
FIG. 3 is an illustration for use to show a decision principle against receive signals in a four-level modulation transmission that is applicable to one embodiment of the present invention.

Now, before describing configurations of the error correction section 31 and the signal quality detection section 32 shown in FIG. 2, let us discuss decision errors that are involved in errors occurring when the aforesaid multilevel modulation is a 4-level modulation, in conjunction with FIG. 3.

When a signal resulting from the 4-level modulation is demodulated, a data decision is made according into which of the four quadrants the receive signal value falls, as shown in the figure.

When such modulation data are transmitted, and when the noise is due to deterioration factors of a constant nature, such as white noise, etc., coordinate positions of receive signal values tend to fall, in a concentrated manner, in a certain range (the area shown with hatching) around reference coordinates (or decided coordinates) of each quadrant. Therefore, effects of noise can be completely eliminated by setting a tolerance area that is more or less wide than the certain range.

On the other hand, suppose that, for instance, a significant disturbance occurs instantaneously and the coordinate position of the "B" signal value in FIG. 3 is moved, across the border of quadrants, into the position "B'" that is within a quadrant of the signal value "A". In such a case, a decision is made misinterpreting the original signal value "B" as the signal "A", which means that a decision error happens.

Incidentally, for example, according to a SQD approach disclosed in the official gazette of the aforementioned earlier application, Japanese Unexamined Patent Publication No. 57-107646, mean values of received respective channels of data over their respective histories are obtained, and each channel's receive quality is detected based on each difference between the respective mean value and a predetermined reference value. Consequently, even when a momentary fluctuation of receive signal values due to an instantaneous disturbance as stated above occurs, it is highly probable that their detection results indicate the fluctuation being within the tolerance, due to the averaging, if the receive signal values of the times other than the time of the instantaneous disturbance are sufficiently near the reference value. In this case, it is determined that the receive quality of the channel is good, thereby allowing the aforementioned data decision errors due to the actual instantaneous disturbance to be overlooked without correction and be output. Therefore, it can be said that the reliability of received data decreases in such cases.

As will be described later, the above problem can be solved according to the error correction section 31 and the signal quality detection section 32 shown in FIG. 2.

Figure 5:
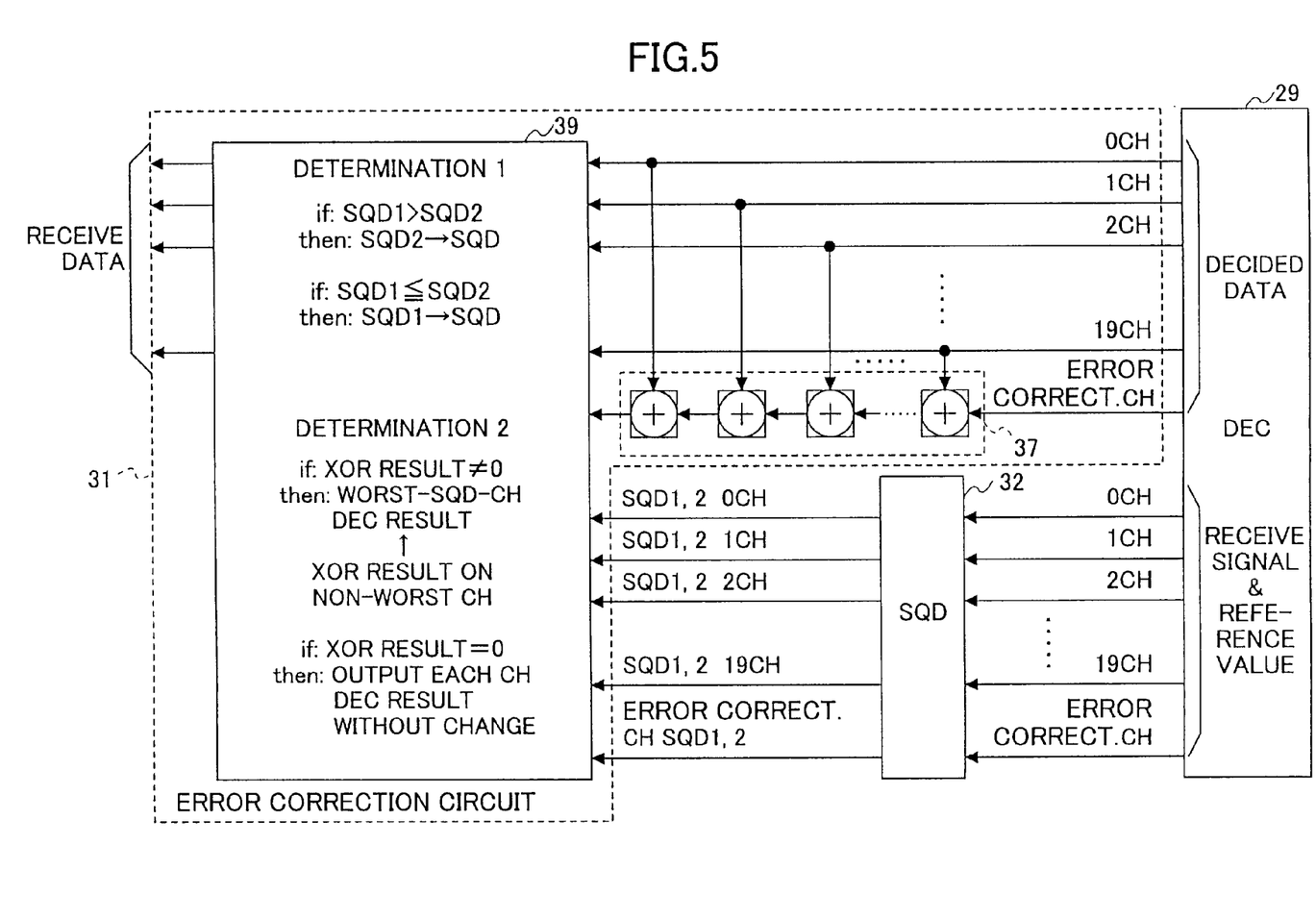
FIG. 5 is a diagram to illustrate the functions of the error correction section shown in FIG. 2.

FIG. 5 is a block diagram to illustrate about the configuration of the error correction section 31 as well as its relations with the signal quality detection section 32 and the decision section 29 associated therewith. As shown in the figure, the decided data of 0CH (channel 0)–19CH (channel 19) from the signal decision section 29 are input into an XOR section 37 and a determination process section 39 of the error correction section 31. The decided data of the error correction CH are input into the XOR section 37. The XOR section 37 can be configured in the same manner as the aforementioned XOR section 35 shown in FIG. 4. Further, data decision reference values and the receive signals on respective channels of 0CH–19CH and the error correction CH are input into the signal quality detection section 32. The XOR section 37 calculates XOR of decided data of 0CH–19CH and the error correction CH, and inputs its operation result into the determination process section 39. The signal quality detection section 32 shown in FIG. 2 calculates signal qualities for respective channels and inputs them into the determination process section 39.

When the result of XOR operation of the data of channels 0CH–19CH, without change, is employed as the send data of the error correction CH at the sending side, and when the result of XOR operation on the each decided channel of data in the XOR section 37 is other than "0" (i.e., when the XOR result is not equal to zero), then the determination process section 39 replaces decided data of the worst channel (i.e., the decision result on the channel having the worst SQD according to the signal quality detection results SQDs of respective channels from the signal quality detection section 32) with results of XOR operations on decided channels of data except the worst channel, and outputs them as the applicable received data. On the other hand, when the result of exclusive OR operations is "0" (i.e., when the XOR result is equal to zero), the decision results of each CH are output as they are, i.e., the decision results of 0CH–19CH are, without change, employed as the received data.

More specifically, for example, when the XOR result is not equal to zero and when the data channel of the worst signal quality is 2CH, then the determination process section 39 replaces data of 2CH by the result of XOR operations on data of channels 0CH, 1CH, 3CH–19CH and the error correction CH, i.e. the channels except 2CH, which is thus employed as the received data. Thus, by using the error correction channel in this manner, one of a plurality of channels of data can be corrected.

Now, the configuration of the signal quality detection section 32, together with the determination operation of the determination process section 39 performed after receiving the outputs of the SQD section 32 are described in detail.

Figure 6:
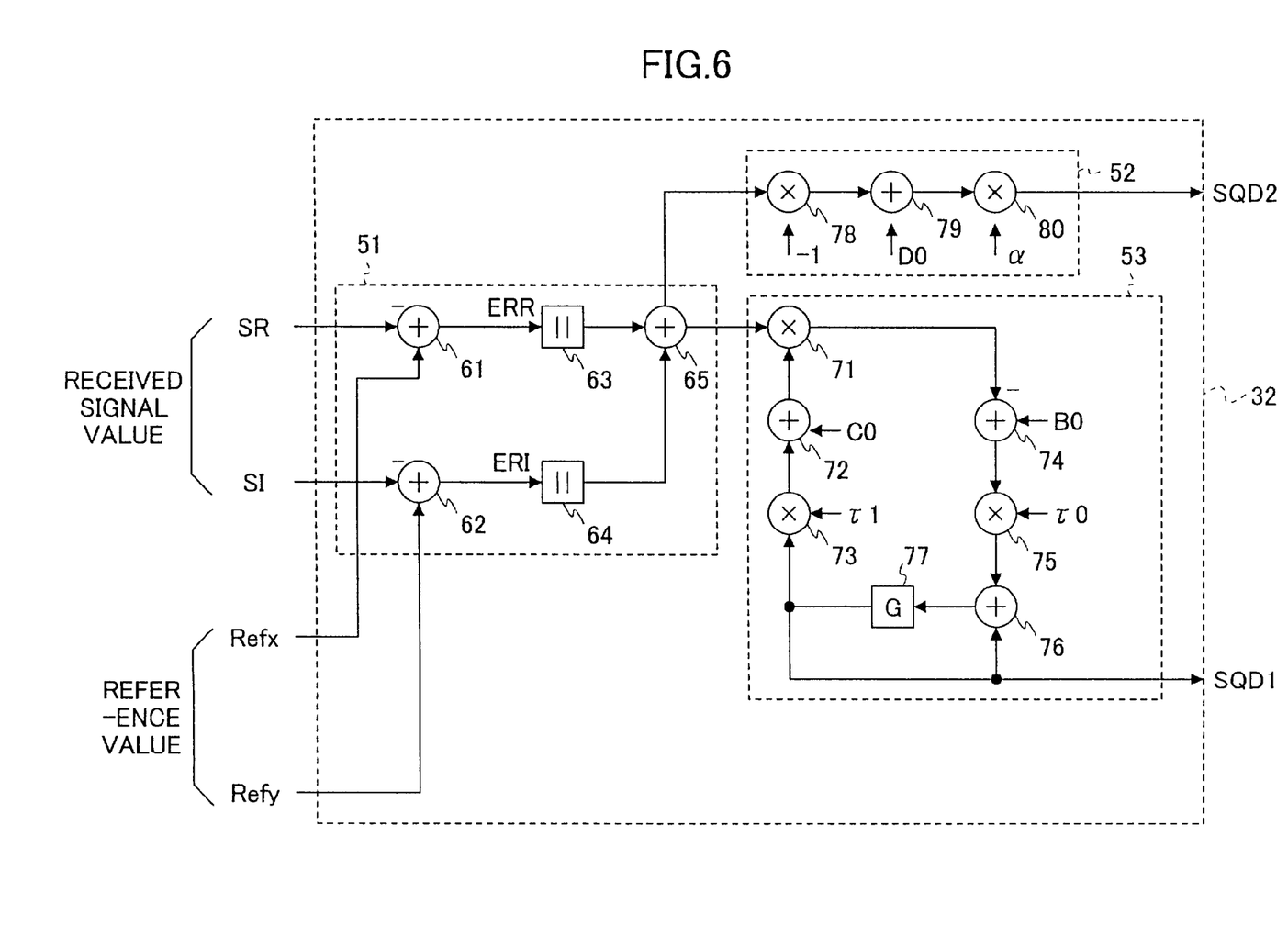
FIG. 6 is a diagram to illustrate a configuration of one of the channels of the signal quality detection circuit shown in FIG. 5.

FIG. 6 is a circuit diagram to show the configuration of each channel of the signal quality detection section 32. The detection section 32 has a configuration to calculate the difference between a predetermined reference value and an error signal of a channel signal and to output SQD1 and SQD2, wherein SQD1 is the time-average value of the difference (i.e., error) and SQD2 is the instantaneous value of the difference. In the determination process section 39, when the time-average value SQD1 is larger than the instantaneous value SQD2 (i.e., when it is determined that there is an instantaneous disturbance), the SQD2 is employed as the conclusive SQD of the corresponding channel. It should be noted that the value of SQD (regardless of whether it is the SQD1 or the SQD2) is a measure wherein larger SQD values indicate better signal quality and smaller SQD values mean worse quality. Also, in the determination process section 39, when the average value SQD1 is equal to or smaller than the instantaneous value SQD2, it is determined that there is no instantaneous disturbance and the SQD1 is employed as the conclusive SQD of the corresponding channel. When the operation result of the XOR circuit 37 is other than zero (i.e., when it is determined that a data error has occurred), further determination is made, wherein the channel having the smallest (or worst) SQD value among the SQDs employed as above, is determined as an error channel. Then, the error correction is carried out by replacing decision results of the error channel with the results of XOR operations performed upon the decision results of the channels except the error channel.

Now, the functions of signal quality detection section 32 shown in FIG. 6 are described piece by piece. The detection section 32 has a decided-error sampling section 51, an averaging section 53 and an instantaneous SQD sampling section 52. In the decided-error sampling section 51, signal vector values SR (real part) and SI (imaginary part) obtained by equalizing receive signals with respect to the corresponding channel from the decision circuit 29 are subtracted from respective decided-reference values Refx and Refy by means of respective adders 61 and 62, so as to obtain error signal vector values ERR (real part) and ERI (imaginary part). The signal vector values SR and SI correspond to actual receive signal values and include phase error components and amplitude error components of the receive signals. The reference values Refx and Refy are, for example, values corresponding to the decided coordinates shown in FIG. 3. More specifically, for example, in the case of the four-level modulation as shown in FIG. 3, when coordinates of the receive signal values are indicated by the point "B'" and the decided data are indicated by the decided coordinates (or the reference coordinates) "A", the error vector values ERR and ERI (that are composed by the differences between the receive signal values and the reference values) correspond to the vector connecting the coordinates' point "B'" with the coordinates' point "A". The amounts of deviation of the actual signal values from the decided reference values are thus obtained. After that, absolute values of these error signal vector values are respectively obtained by absolute value adders 63 and 64. Then, the obtained absolute values are further added by an adder 65, thus performing a conversion into scalar values.

Next, in the averaging section 53, the decided error output, i.e., the scalar value obtained by the conversion in the decided-error sampling section 51, is subtracted from a reference value "B0" with an adder 74, then the result of the subtraction is multiplied by a control-force constant "τ0" to determine the integration time constant at the multiplier 75 and thereafter is further integrated at an integration circuit that includes an adder 76 and a feedback gain circuit "G". Therefore, when a situation of the decided error outputs being smaller than the reference value "B0" continues, SQD1, i.e. the outputs of the averaging section 53, are increased by additions to the plus ("+") side one after another. On the other hand, when a situation of the decided error outputs being larger than the reference value "B0" continues, SQD1 is decreased by additions to the minus ("−") side. Finally, thus, the SQD1 value is obtained within the range of from −2 to +2, i.e., the range between the computational limits. In the averaging section 53, the above integrated outputs are further multiplied by a control-force constant "τ1" at a multiplier 73, and are then added to a reference value "C0" at an adder 72, of which results are fed back into the feedback point 71 of the decided-error outputs.

Now, respective values of the constants at the computing units in the averaging unit 53 are described below.

First, the reference value that is subtracted from the signal error output values at the adder 74 is given as:

$B0 = 0.078125$

This value is equal to a signal error output value where the mean signal quality value equals the reference value. This value is determined in accordance with the multilevel modulation ratio in the data transmission method.

The control-force constant "τ0" that is used in the multiplication at the multiplier 75 is given as:

$\tau 0 = 0.125$

This is the value for determining the control force at the time of integration of SQD1 values at following integration circuits 76 and 77 and is typically determined as a value that makes the integral values settle down to a fixed value within about one second.

The control-force constant "τ1" that is multiplied at the multiplier 73 and the reference value "C0" that is added at the adder 72 are respectively given as:

$C0 = 1.0$ $\tau 1 = 0.5$

These values are determined in such a manner that when SQD1=0 (i.e., when the decided error amount is equal to the reference value), the feedback amount against the decided error amount becomes 1; when SQD1>0 (i.e., when the decided error amount is smaller than the reference value), the feedback amount becomes larger; when SQD1<0 (i.e., when the decided error amount is larger than the reference value), the feedback amount becomes smaller. In other words, when the signal quality value is the reference value, multiplication is made by "1" at the multiplier 71 (i.e., the feedback point), which means that the feedback amount in such case is equal to "1". When the signal quality value is smaller than the reference value (i.e., when the quality is deteriorating), positive feedback amount becomes smaller, so as to effect a reduction on the product of the multiplication with the large decided error. When the signal quality value is larger than the reference value, positive feedback amount becomes larger, which effects an increase on the product of the multiplication with the small decided error. Therefore, these tend to have the effect of averaging (or evening out) the mean signal quality values SQD1 that are the output of the averaging section 53.

On the other hand, in the instantaneous SQD sampling section 52, a multiplier 78 performs inversion (or polarity reversal) upon the decided error output of the decided error sampling section 71, an adder 79 adds a reference value "D0", and then the result is multiplied by a constant "α" at a multiplier 80 so as to obtain the SQD2 value. The reference value "D0" is usually equal to the value of the reference value "C0" (for example, "1.0") in the above averaging section 53. The constant "α" is a value by which the scaling against the SQD1 value (that is the output of the averaging section 53) is adapted. Specifically, $\alpha = 2.0$ is given. This value is determined in such a manner that, when the decided error amount is equal to 0 (reference value), the output SQD2 of the instantaneous SQD sampling section 52 becomes:

$SQD2 = +2;$ and, when the decided error amount is equal to 2 (a limit of the calculation range), the output of the instantaneous SQD sampling section 52 becomes:

SQD2=−2

When the multilevel modulation ratio of the data transmission increases, this constant "α" is adjusted by a corresponding increase. This is because an increase of multilevel modulation ratio effects smaller distances between signal points, thereby increasing fluctuations of SQD1 against detected error amounts.

Figure 7:
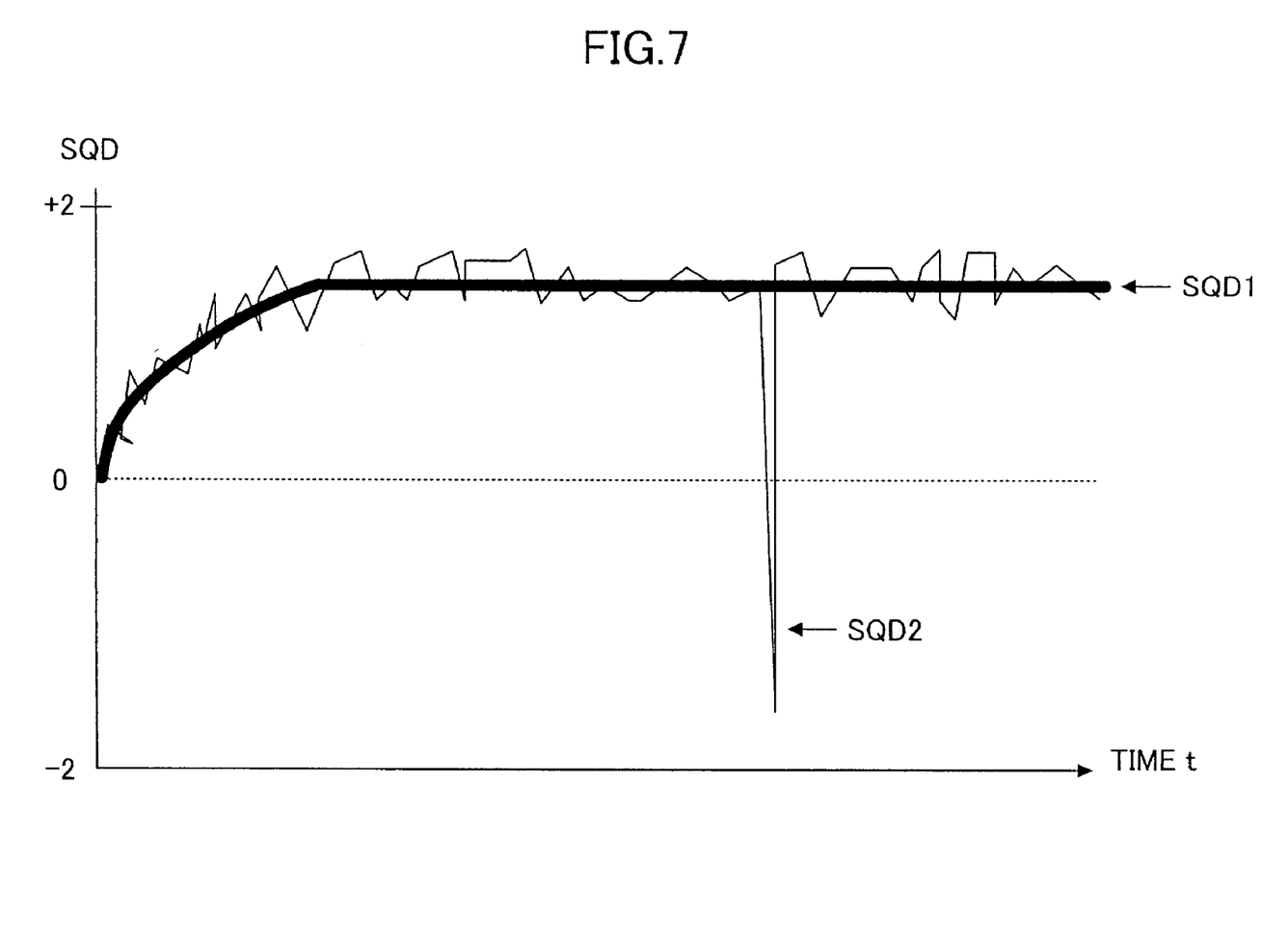
FIG. 7 is a diagram showing an, example of fluctuations of mean signal quality value and instantaneous signal quality value according to the channel configuration of FIG. 6.

FIG. 7 shows a fluctuation example of thus obtained average signal quality values SQD1 and instantaneous signal quality values SQD2 in comparison. As shown in the figure, SQD1 reaches an almost constant (or fixed) value when a certain time period goes by since the beginning of the operation. Its value does not change much at all, even when an instantaneous disturbance occurs. In contrast, the value of SQD2 fluctuates momentarily reflecting the occurrence of an instantaneous disturbance when such instantaneous disturbance occurs, although under normal conditions, the value of SQD2 is in the neighborhood of the mean value SQD1. The SQD2 at the instantaneous disturbance takes a value instantaneously largely deviated in the minus direction, in which case, one of the determinations in the determination process section 39 shown in FIG. 5 is made as SQD1<SQD2 (SQD1 is larger than SQD2), thereby employing SQD2 as the channel's SQD, wherein when the SQD value is smaller than any other channel's SQD (i.e., when it is the worst), the value of that channel is determined as the "error", on which the error correction can be performed. Therefore, it has become possible that, according to the embodiment of the present invention, data errors due to instantaneous disturbances are reliably detected and corrected.

Figure 8:
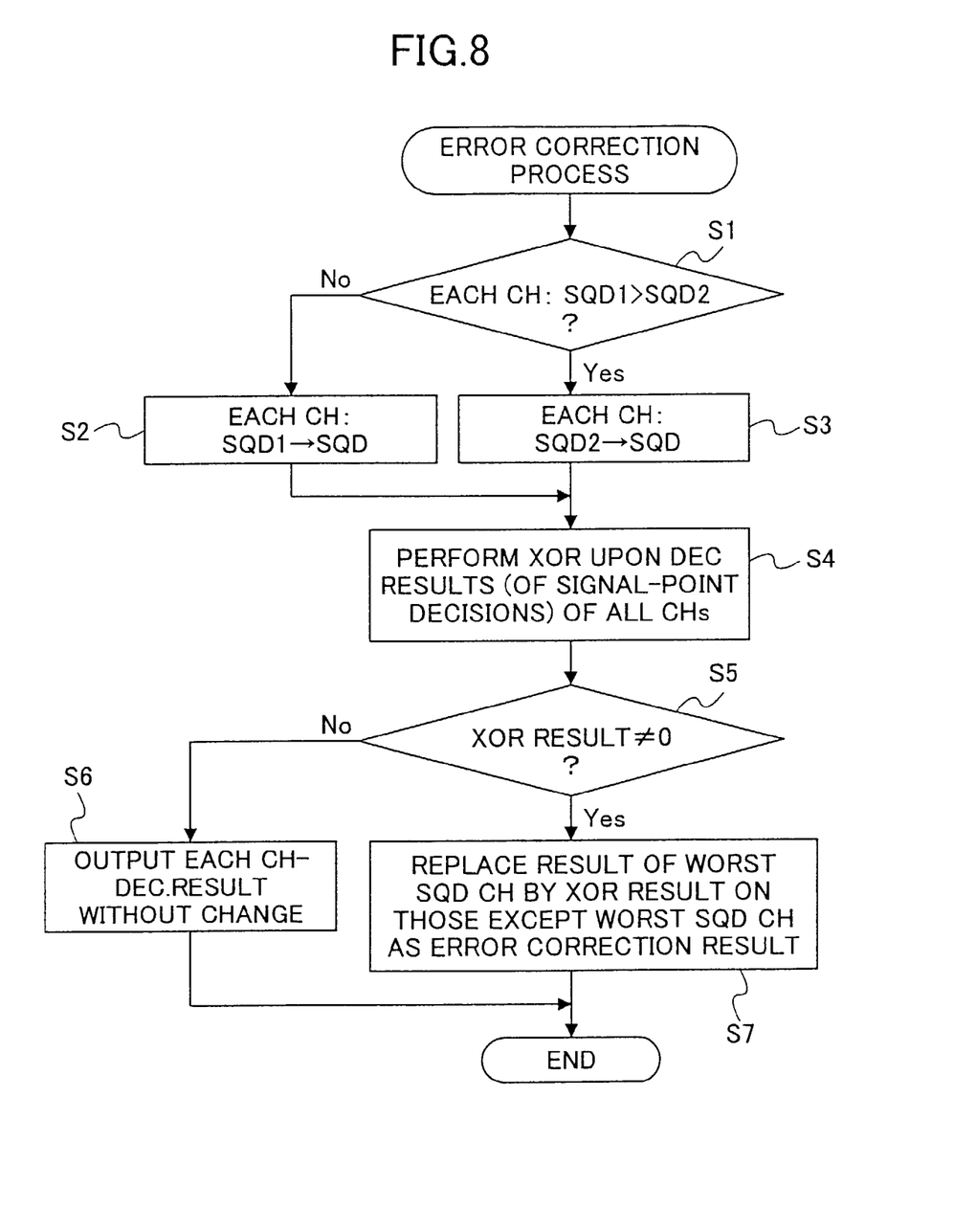
FIG. 8 is a flow chart to illustrate the operations of the determination process section shown in FIG. 5.

FIG. 8 is a flow chart to illustrate the error correction operation in the aforementioned determination process section 39. As shown in the figure, in step S1, about the respective channels of data, it is determined whether the mean signal quality values SQD1 are larger than the instantaneous signal quality values SQD2, i.e., it is determined whether an instantaneous disturbance exists per each channel. When the answer is "Yes", i.e., when an instantaneous disturbance is detected, SQD2 is employed as the SQD of the channel in step S3. On the other hand, when the answer of step S1 is "No", SQD1 is employed as the SQD of the channel (in step S2).

After that, in step S4, the XOR (or the exclusive OR) of the decision result of the respective channels from the decision circuit 29 is calculated by the XOR section 37. Then a determination is made as to whether the calculation result is 0 or not (in step S5), wherein if the result is 0, the decision result of each channel, as it is from and obtained by the decision circuit 29, is output as the applicable channel received data (in step S6). On the other hand, if the determination result in step S5 is other than zero, there comes step S7, wherein, decided data obtained from the decision circuit 29 with respect to a channel that has the worst one of the SQDs (i.e., the smallest SQD value) of the channels obtained in step 2 or step 3 is determined as "error", and, an XOR operation is performed on other channels except that worst channel. Then the result of this XOR operation is output as the receive data of that channel. As for other channels, the output values from the decision circuit 29, as they are, are output as the receive data.

In the above descriptions, as shown in FIG. 4 and FIG. 5, an "exclusive OR" operation on three or more values is carried out by sequential XOR operations, one operation between two values at a time, which means that, first, an XOR operation is performed on two of the three or more values, then, a second XOR operation is performed between one of the remaining values and the result of the first XOR operation, and then, a still further XOR operation between another one of the remaining values and the second XOR operation result, and so forth, thereby obtaining the final operation result.

As described above, according to the present invention, multi-channel data can be configured by providing a correction channel and applying a value of a specific operation result of the data channels, therefore, when an error occurs in a channel, the occurrence of error can be easily detected and a correct value for that channel can be easily estimated. Also, since the signal quality is calculated from the difference of the signal value and the data decision reference value per each channel so as to determine the channel having the worst signal quality as the error-occurring channel, it is possible to effectively determine the error-occurring channel. Further, when the signal quality is calculated, since both the mean value and the instantaneous value are calculated so as to determine the worst signal quality channel by referring to both of them, it is possible to effectively correct data error even in a situation where there is considerable instantaneous noise in addition to constant noise.

The embodiments of the present invention are not limited to the above disclosed examples; various changes and modifications can be foreseen from them within the range that achieves the basic ideas of the present invention.

The invention claimed is:

1. A data processing apparatus, comprising:
a decision means for deciding a plurality of channels of original data and a channel of correction data based on signals obtained by transmitting signals that contain said plurality of channels of original data and said channel of correction data via a predetermined medium, said channel of correction data containing a value of a result of a predetermined operation performed on said plurality of channels of original data;
an operation means for performing one or more predetermined logic operations on the decided plurality of channels of data and the channel of correction data;
a signal quality detection means for detecting signal qualities with regard to said signals that are subjected to said data decisions by said decision means, said detections being done for respective channels; and
a correction means for replacing decided data of a worst channel that has a worst detection result according to said signal quality detection means by a value estimated from the other channels of decided data except said worst channel when the operation result of said operation means is other than a predetermined value,
wherein said signal quality detection means calculates a mean signal quality and an instantaneous signal quality, and wherein said correction means refers to said mean signal quality and said instantaneous signal quality, so as to determine said worst channel that has the worst signal quality.

2. A data processing method, comprising:
a decision step, during which are decided a plurality of channels of original data and a channel of correction data based on signals obtained by transmitting signals that contain said plurality of channels of original data and said channel of correction data via a predetermined medium, said channel of correction data containing a value of a result of a predetermined operation performed on said plurality of channels of original data;
an operation step, during which is performed one or more predetermined logic operations on the decided plurality of channels of data and the channel of correction data;

a signal quality detection step, during which are detected signal qualities with regard to said signals that are subjected to said data decisions in said decision step, said detecting being done for respective channels; and a correction step, during which decided data of a worst channel that has a worst detection result in said signal quality detection step are replaced by values estimated from other channels' values when the operation result in said operation means is other than a predetermined value, wherein a time-averaged mean signal quality and an instantaneous signal quality are calculated in said signal quality detection step; and wherein said time-averaged mean signal quality and said instantaneous signal quality are referenced so as to determine said worst channel that has the worst signal quality in said correction step.

3. The data processing method as claimed in claim 2, wherein each of said one or more predetermined logic operations includes an XOR operation.

4. The data processing method as claimed in claim 3, wherein said channel of correction data comprises a result of said XOR operation on said plurality of channels of data, and, in said correction step, when the result of said XOR operation in said operation step is other than zero, said decided data of said worst channel that has the worst signal quality are replaced by a result of a XOR operation on the other channels of decided data.

5. The data processing method as claimed in claim 2, wherein, in said correction step, one of said mean signal quality and said instantaneous signal quality obtained in said signal quality detection step is employed as the channel's signal quality for each channel, said employed one having a worse signal quality deterioration degree than the other, and, when the operation result in said operation step is other than said predetermined value, the decided data of the channel whose signal quality shows the worst signal quality deterioration degree among all the likewise employed channel's signal qualities is replaced by the data estimated from the other channels of the decided data.

6. The data processing method as claimed in claim 2, for receiving signals transmitted via said predetermined medium and reconstituting said original data that are submitted to said transmission, said data processing method further comprising a demodulation step for demodulating a plurality of channels of multilevel modulation data;

wherein original data are decided, in said decision step, by comparing values of signals demodulated in said demodulation step with respective multilevel modulation reference values;

wherein differences between respective said reference values and said decided data decided in said decision step in the aforementioned manner are obtained as the signal qualities in said signal quality detection step.

7. A data processing apparatus, comprising:

a decision circuit for deciding a plurality of channels of original data and a channel of correction data based on signals obtained by transmitting signals that contain said plurality of channels of original data and said channel of correction data via a predetermined medium, said channel of correction data containing a value of a result of a predetermined operation performed on said plurality of channels of original data;

a logic circuit for performing one or more predetermined logic operations on the decided plurality of channels of data and the channel of correction data;

a signal quality circuit for detecting signal qualities with regard to said signals that are subjected to said data decisions by said decision circuit, said detections being done for respective channels; and a correction circuit for replacing decided data of a worst channel that has a worst detection result according to said signal quality detection circuit by a value estimated from the other channels of decided data except said worst channel when the logic operation result of said logic circuit is other than a predetermined value, wherein said signal quality detection circuit calculates a mean signal quality and an instantaneous signal quality, and wherein said correction circuit refers to said mean signal quality and said instantaneous signal quality, so as to determine said worst channel that has the worst signal quality.

8. The data processing apparatus as claimed in claim 7, wherein each of said one or more predetermined logic operations includes an XOR operation.

9. The claim processing apparatus as claimed in claim 8, wherein said channel of correction data comprises a result of said XOR operation on said plurality of channels of data, and wherein, when a result of said XOR operation by said operation means is other than zero, said correction circuit replaces said decided data of said worst channel that has the worst signal quality by a result of a XOR operation on the other channels of decided data.

10. The data processing apparatus as claimed in claim 7, wherein said correction circuit employs one of said mean signal quality and said instantaneous signal quality obtained by said signal quality detection means as the channel's signal quality, wherein the employed one has a worse signal quality deterioration degree than the other, and, when the logic operation result of said logic circuit is other than said predetermined value, the decided data of the channel whose signal quality shows the worst signal quality deterioration degree among all the likewise employed channels' signal qualities is replaced by the data estimated from the other channels of the decided data.

11. The data processing apparatus as claimed in claim 7, for receiving signals transmitted via said predetermined medium and reconstituting said original data that are submitted to said transmission, said data processing apparatus further comprising a demodulation circuit for demodulating a plurality of channels of multilevel modulation data;

wherein said decision circuit decides original data by comparing values of signals demodulated by said demodulation circuit with respective multilevel modulation reference values;

wherein said signal quality detection circuit obtains differences between respective said reference values and said decided data decided by said decision circuit in the aforementioned manner as the signal qualities.

* * * * *